Aug. 6, 1974 G. E. KAYE 3,827,914
ACTIVATOR FOR A RESERVE ELECTRIC CELL, AS IN A FLASHLIGHT
Filed March 5, 1973 3 Sheets-Sheet 1

Aug. 6, 1974  G. E. KAYE  3,827,914
ACTIVATOR FOR A RESERVE ELECTRIC CELL, AS IN A FLASHLIGHT
Filed March 5, 1973  3 Sheets-Sheet 3
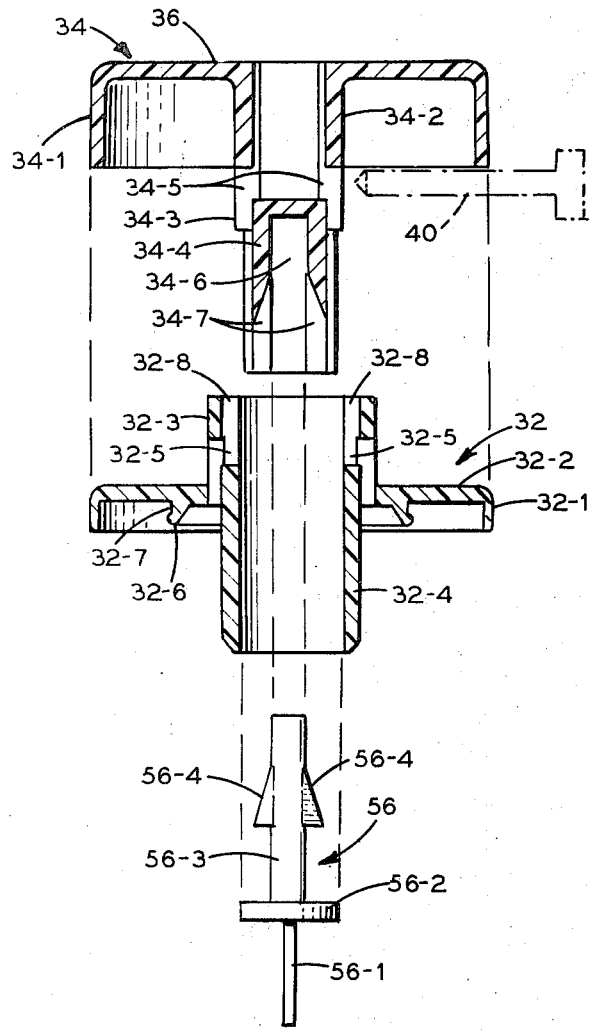
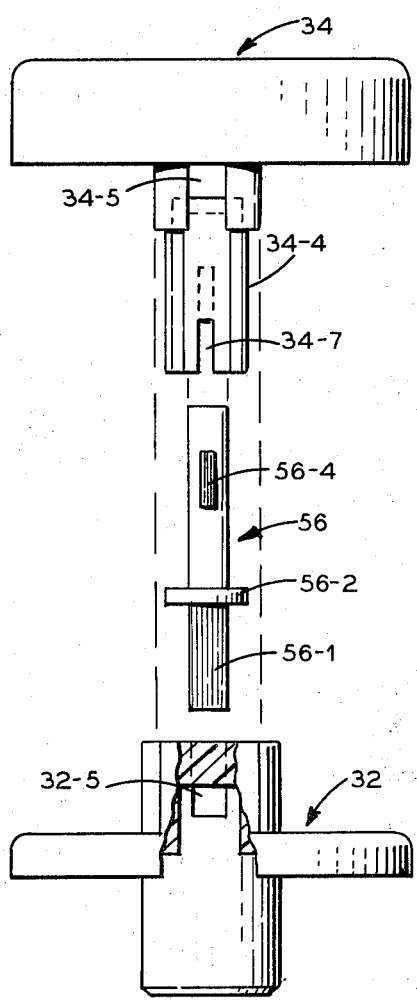
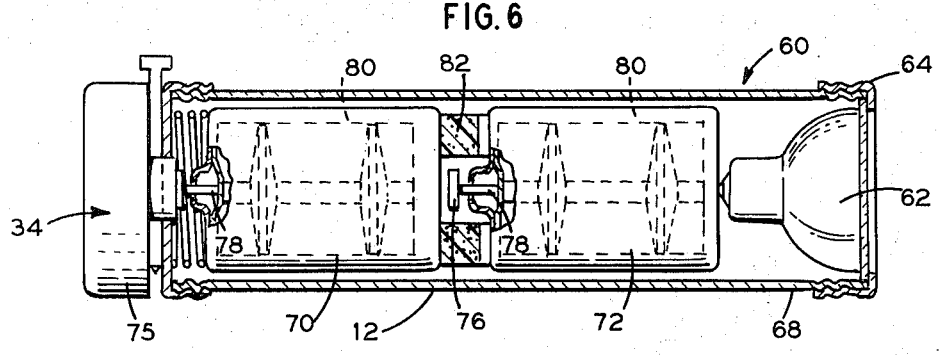

3,827,914
ACTIVATOR FOR A RESERVE ELECTRIC CELL, AS IN A FLASHLIGHT

Gordon E. Kaye, Garrison, N.Y., assignor to P. R. Mallory & Co. Inc., Indianapolis, Ind.
Filed Mar. 5, 1973, Ser. No. 338,001
Int. Cl. H01m 1/00, 21/00
U.S. Cl. 136—113                                    8 Claims

ABSTRACT OF THE DISCLOSURE

An activator for a cell of the reserve type is made separable and detachable from the cell or the utilization device in which the cell is incorporated, which for the present purpose is shown as a flashlight. The mechanism may be reused, as desired, for controlling subsequent reserve cells after the immediate cell has served its purpose. The activator is provided with a detent pin to prevent undesirable operation of the activator by casual external forces, and thus provides a reserve cell with restraining protection to prevent undesired activation of the cell until such activation is desired, and then the detent can be easily manually released and the activator can be manually operated, either by direct hand pressure or by reaction pressure against a stationary surface.

---

This invention relates generally to deferred chemical reaction devices, and make-ready condition devices including means and methods for activating primary cells and reserve cells.

In order to increase the useful longevity of batteries, both for military and civilian use, it is desired that battery devices be kept at a ready condition until the operation thereof is required. In this manner, the life cycle of the device is only initiated at the time the operation of the device is required. Such devices have been described as "reserve cells" in that the energy output is withheld or reserved until required. Moreover in such devices it is required that the operation of the device be positive and be fool-proof. Accordingly, the forces and mechanism required to activate such devices must be such that untoward and accidental firing of the devices be precluded. However, concomitantly, the activating or firing of the devices must be exceedingly rapid and positive, and the construction of the firing apparatus in association with its cell be as simple as possible.

The invention has generally applicability for activating a reserve cell, and, by way of illustration of its flexibility, the invention is shown as applied to a flashlight, which is a device that particularly must rely upon an electric cell to have a long time shelf life, so the cell will be available and in good operating condition even if the flashlight has not been used for a long period of time.

The reserve cell which is illustrated and utilized in this application is one of the type shown in United States Pat. No. 3,484,297 of John F. Zaleski, assigned to the assignee of this application.

The cell is manufactured in a dry state, the electrolyte being isolated and contained in a plastic vial within the cell. When stored in this manner, shelf life capabilities of 10 years or more can be attained.

To activate the cell, the activating mechanism is designed to be operated by a hand pressure on an external pressure pad associated with the activator, which, in this case, will be shown for illustrative purposes as mounted on the rear end of a flashlight shell. The reserve cell which is here shown utilized will be of the standard "D" size.

Activation time is approximately two seconds when the cell is not under load. When under a 4 ohm load, the activation time, to a 1.35 volt level, is less than 5 seconds at 70° F., and less than 30 seconds at 30° F. The cell is thus considerably more efficient and usable than other such cells.

The cell has been constructed so that it is not position sensitive, either during the activation or discharge period, and after activation, can be handled and used as a standard alkaline manganese cell, 2 years under casual storage conditions.

A primary object of the invention is to provide a simple inexpensive activator for a reserve type cell, which will permit the cell in its environmental assembly to be shelf stored for given periods of time, without deterioration, and can be made available immediately when desired.

Another object of the invention is to provide a reserve type of primary cell, with a simple activator that is safely held against undesired operation, so that operation of the activator will occur only when a predetermined manual operation is performed.

Another object of the invention is to provide an activator which may be associated and combined with a reserve type electric cell for disposition in and on present conventional flashlight body shells, so that such flashlights may be equipped with reserve type cells that will permit the flashlights to be stored and that will assure satisfactory operation of the flashlight as expected and desired when the flashlight needs to be used.

Another object of the invention is to provide an assembly of more than one reserve cell, in which the single activator will activate the several cells at one time, for their desired use, as in a flashlight.

The details of construction of an activator in accordance with the invention, and its application to a single cell or multi-cell flashlight, by way of illustration of the utility of the invention, are described in the following specification, and are shown in the accompanying drawings, in which FIG. 1 is a vertical elevational view of a flashlight to which the activator is shown applied;

FIG. 4 is an exploded view of parts of the activator embodying the invention, and shows how the locking detent pin may be fitted to hold the activator against undesired relative movement;

FIG. 5 is a further exploded side view of the activator, to show the relation between parts, and the relative location of the fracturing pin for the electrolyte vials; and FIG. 6 is a longitudinal open view of the flashlight, to show how the pressure is transmitted from the top cell to fracture the vial in the bottom cell for activation of the two cells together.

The invention generally contemplates the provision of an activator and reserve cell assembly, so the reserve type cell can be used with a device, such as a flashlight, that normally is stored to be immediately available for some future use at some random future time, with the provision of the reserve type cell, in order to assure that the cell, and therefore the flashlight, will be in operative condition for that expected service at such future random time.

Figure 1:
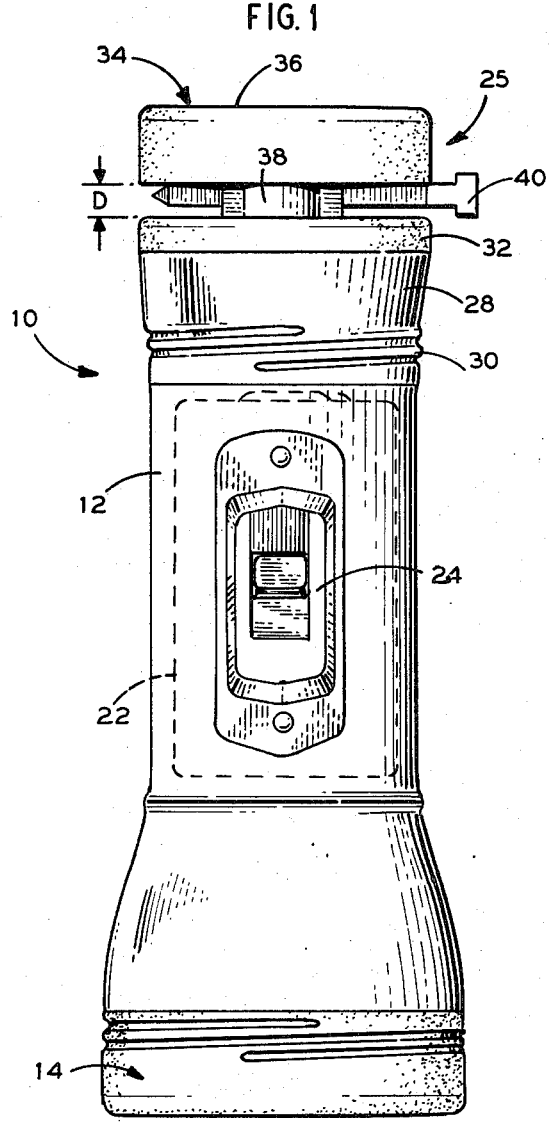
Figure 3:
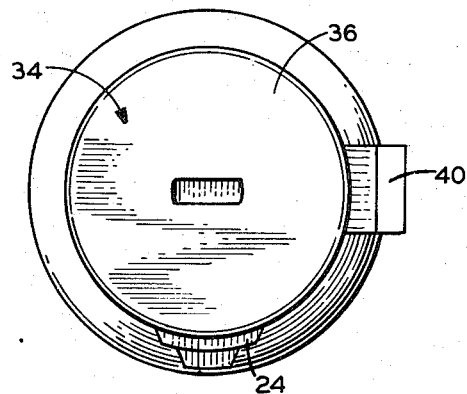
FIG. 3 is a plan view of the top or back end of the activator of the flashlight.

As shown in FIG. 1, a flashlight 10 comprises a central cylindrical body 12, at whose front end 14 is disposed a small lamp 16, suitably held in place on the body 12 by a front cap 18 that is threaded onto the body 12 and serves to hold a lens 20 of appropriate construction on the body of the flashlight, and wherein there is provided the usual cell 22. A thumb switch 24 on the body shell 12 serves to connect the cell 22 electrically to the lamp 16, to develop the light beam that is desired.

A flashlight, such as the flashlight 10, might lie in a drawer, unneeded, over an extended period of time, before it is called upon for use. An ordinary cell with all of the cell elements actively related, lying thus unused, could be affected by chemical interaction between the ingredients and the elements of the cell to such an extent that the cell voltage might be considerably reduced and be below normal, when the flashlight is picked up for use. The use of a reserve cell in the flashlight, as one of the objects of this invention, assures that the cell can be placed into immediately effective operating condition by activating the cell, when it is desired to utilize the flashlight.

In accordance with this invention such a reserve cell in the flashlight is arranged to be activated when needed, and such activation will generally place a cell in condition for use within a few seconds.

To accomplish such activation, an activator 25 is employed that is arranged to be mounted on the back end of the flashlight shell body 12.

The activator 25, as seen in FIG.1, is supported and mounted on a retaining ring 28, that is provided with suitable screw threads 30 by means of which the ring can be mounted and assembled on the flashlight body 12 in conventional manner.

The retaining ring 28 supports a guide bearing cap 32, upon which is slidably mounted a pressure cap or pad 34, that embodies a pressure pad 36 and a guide cylinder 38, depending therefrom, that fits into a corresponding element on the guide bearing cap 32.

Depression or axial movement of the pressure pad 34 through the small distance "D", to engage the guide bearing cap 32, is sufficient movement to activate the reserve cell within the flashlight body. However, in order to prevent activation of the cell by casual or accidental bumping of the pressure pad, a restraining detent pin 40 is provided to prevent relative axial movement between the pad 34 and the guide bearing cap 32, so long as the detent pin 40 is in restraining position as shown in FIG. 1. When the detent pin 40 is removed, the cap 34 may then be manually depressed, or struck a sudden blow, to cause it to move down and toward the guide bearing cap 32, and the movement of the internal pieces attached to the pressure pad 34 will activate the cell, as will be shown in more detail in subsequent figures and description.

Figure 2:
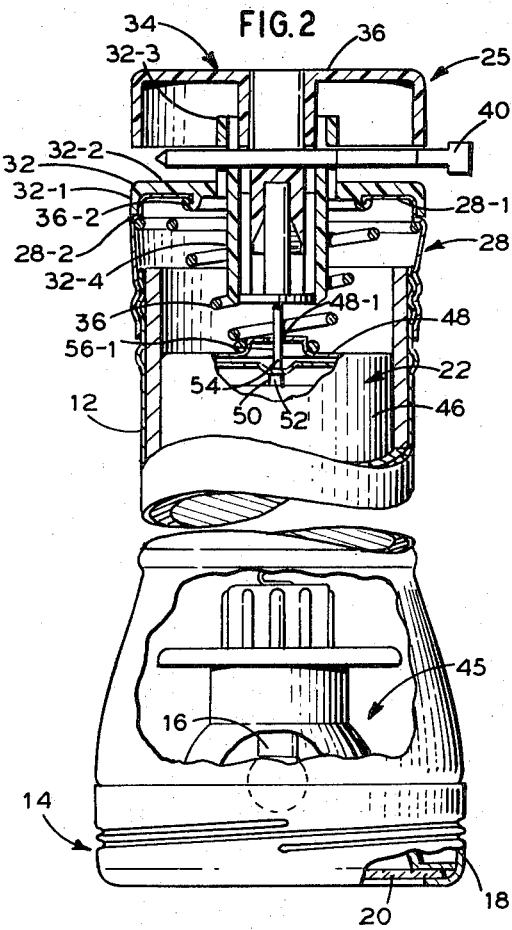
FIG. 2 is a similar vertical elevational view with parts of the case of the flashlight broken away, to expose the inside with some of the interior elements shown in section.

FIG. 2 is shown with part of the shell casing of the flashlight broken away, to expose the interior, and shows a simple outline of a lamp and reflector assembly 45 at the front of the flashlight, and the detailed structure of the activator 25, at the rear of the flashlight, with the disposition of the detent pin 40 in blocking or detent position, to prevent downward movement of the pressure pad 34 that would activate the reserve cell 22 in the shell body 12. FIG. 2 shows more fully the manner in which the electrical circuit is established from the cell to an through an expanded pyramidal helical spring 36 to the metallic shell body 12 of the flashlight to energize the lamp 16 at the front of the flashlight.

The reserve cell used herein is of the type and construction shown in more detail in the United States Pat. No. 3,484,297, previously referred to, and for the present purpose, in connection with FIG. 2, it is sufficient merely to identify certain elements of the cell, as, for example, the cathode metal can 46, an anode top metal cover 48 that is insulated from the metal can 46, a fracturable vial 50 hermetically sealed, containing the isolated electrolyte 52, whose release from the vial 50 and passage into the space into the cell between the cathode and anode elements, 46 and 48, will activate the cell 22 and render it immediately operative to supply energy to the flashlight lamp 16 when the thumb switch 24 is operated for that purpose. The cell 22 additionally includes a flexible sealing disc element 54 through which pressure may be applied to the top of the vial 50, to fracture the vial, by downward pressure of a pressure pin 56 operated to move downward through a guide slot 48–1 in the top of the anode top metal cover 48.

To provide the electrical circuit from the top of the cell 22 to the shell body 12 as a conductor to the front lamp 16, the helical spring 36 is employed of inverted pyramidal shape, with the lower end of the spring sitting and resting upon the anode disc 48 and the uper end of the spring 36–2 resting against the inner surface of an annular flange 28–1 constituting an upper part of the coupling screw cap 28 that fits onto the shell body 12 of the flashlight. The flange 28–1 in the present instance also serves as seating support for an element of the guide bearing cap 32, previously shown in FIG. 1. As shown in this FIG. 2, the guide bearing cap 32 is provided with a peripheral apron 32–1 that nests on and seats on an inwardly formed shoulder seat 28–2 of the metal screw cap 28.

As further shown in FIG. 2, and in clearer detail in FIG. 4, the guide bearing cap 32 is shown formed of a single plastic element, embodying the top circular disc 32–2 encircled by the peripheral apron 32–1, previously referred to, with the top circular disc 32–2 jointed to and supporting a rising guide portion 32–3 and a depending coaxial cylindrical bearing portion 32–4. For the purpose of receiving and supporting the detent pin 40, of FIGS. 1 and 2, two vertical slot spaces 32–5 are provided on diametrically opposite sides of the rising cylinder 32–3 of guide bearing 32 and the depending cylinder 34–2 of the pressure pad 34. A circular depending lip 32–6 is provided on the under surface of the disc 32–2 to provide and locate a circular peripheral groove 32–7 which receives and seats and holds the top convolution 36–2 of the metal conductor spring 36 that is to provide the electrical connection from the top of the cell to the metallic top annular flange 28–1 of the threaded anchor cap 28 that fits onto the back end of the shell body 12.

The pressure pad 34 of FIG. 1 and 2 is shown in more detail in FIGS. 4 and 5. The pressure pad 34 is shown as having a top annular disc surface 36, as in FIGS. 1 and 2, with a peripheral side apron 34–1, and an internal coaxial boss 34–2 with two separate coaxial guides 34–3 and 34–4, both depending coaxially from the boss 34–2, in order to provide coaxial guided movement of the pressure pad 34 into the guide bearing 32 serving as a stationary cap on the back end of the flashlight. The two guide elements 34–3 and 34–4 serve two specific purposes:

One, to assure proper alignment of the pressure pad 34 in the guide 32 to align the holes for the detent pin 40; and two, to properly dispose the puncturing pin relative to the cell.

Thus, the pressure pad 34 may be rotated until the guide ribs 34–3 will fit into appropriate guide slots 32–8 in the lower stationary guide bearing piece 32, at which time the pin hole openings for the detent pin 40 will be diametrically aligned, so that openings 34–5 in the upper pressure pad 34 will be aligned with the openings 32–5 in the lower guide bearing piece 32.

While the detent pin is in those openings 34–5 and 32–5, the pressure pad 34 and the guide bearing 32 are locked against movement.

When the detent pin 40 is removed, the top pressure pad 34 may then be pressed downward, without any rstraint, to operate the pressure pin 56, where its function is to press the resilient sealing element 54, of FIG. 2, against the top of the electrolyte vial 50 to fracture that vial and to release the contained electrolyte.

Returning to the pressure pin 56 as shown in FIG. 4, the pressure pin 56 is shown as embodying a front puncturing pin end 56–1 depending from a pressure disc 56–2 at the lower end of a cylindrical shank 56–3 that supports a pair of locating wings 56–4 in order to assure proper disposition of the puncturing pin end 56 in its supporting guide carrier 34–4, in order to assure that the puncturing pin will be in proper position with respect to the pressure pad 34 so predetermined axial movement of the pressure pad 34 will cause proper forward movement of the puncturing pin 56-1, and the two wings 56-4 will also assure that the pin 56-1 which is of rectangular cross section will fit properly into the slot 48-1 in the anode to cover 48 of the cell when the activator is assembled on the back end of the flashlight shell for proper positioning to be able to activate the reserve cell when desired.

As indicated by the dimension lines of the exploded view in FIG. 4, the shank 56-3 is such as to fit with a retaining slip fit into the hollow coaxial recess 34-6 in the depending guide and slide piece 34-4. The two wings 56-4 on the pressure pin 56 fit with a relatively holding fit into two opposite slots 34-7 to hold the pressure pin against relative rotary movement. Downward pressure of the top pressure pad 34 acts on the disc 56-2 of the puncture pin 56 to cause the pin to fracture the electrolyte vial 50.

In FIG. 5, the construction of the elements of FIG. 4 are shown from the side view of FIG. 4, so that the two slots 34-7 are seen as serving to receive the two wings 56-4 of the pressure pin 56. FIG. 5 serves also to show the manner in which the lower guide bearing piece 32 fits over the depending part 34-5 of the top pressure pad 34, in order to place the detent pin opening 32-5 of the lower guide piece 32, in alignment with the detent pin opening 34-5 of the top pressure pad 34, so the detent pin 40 may be readily inserted to lock the two pieces 32 and 34 together to prevent relative axial movement between them. When the detent pin 40 is later removed, the pressure pin projection 56-1 may be advanced to enter the activating slot 48-1 in the electric cell of FIG. 2, that would enable that pressure pin to activate the cell by fracturing the vial 50 containing the electrolyte.

It will be clear now from consideration of FIGS. 2, 4 and 5, that withdrawal of the detent pin 40 will permit the pressure pad 34 to be lowered down onto the lower guide bearing piece 32, and, correspondingly, to move the pin 56 downward to a position where the pin blade 56-1 will engage the flexible sealing diaphragm of the cell in FIG. 2 to cause the pin blade 56-1 to fracture vial 50 and release the electrolyte contained therein.

In larger flashlights, two or three cells may be employed to provide a higher voltage for a stronger light beam. The principles of the present invention are applicable to such a larger flashlight, and for the purpose of illustration, such a flashlight is illustrated in FIG. 6 to show the arrangement for controlling two reserve cells in electrical series relationship.

As shown in FIG. 6, a flashlight 60 is provided with a front lamp and reflector 62, that are held in position by a front cover 64 provided with threads for application to the front end of a shell body 69 for containing two reserve cells 70 and 72. An activator is provided, similar to that shown in the single cell flashlight of FIGS. 1 to 5.

The activator 75 for this two-cell flashlight is similar to activator 25 of FIG. 1; and a simple intermediate pressure button 76 is provided between the two cells 70 and 72. Thus, an activating pressure force that is impressed on the pressure pad 34 will be first transmitted to a through rod 78 in the vial 80 of the top cell 70, and then applied to said pressure button 76, between the two cells.

The pressure button 76 serves two purposes. First, to transmit the pressure from the back cell 70 to the front reserve cell 72 in order that the single operation of the activator will be effective to activate both cells at the same time, so they will be immediately available to provide the energy to the lamp.

Second, the pressure button 76 is of conducting material, and after the activating operation, it is held in direct physical and electrical contact between the metallic case of cell 70 and the insulated anode top disc of cell 72, to maintain continuing electrical circuit relationship.

The pressure coupling button 76 consists of a main shank body 76 with a coaxial extension pressure pin 78. The coupling button 76 is held co-axially in proper position between the two cells 70 and 72 by means of an encircling annular washer 82 of suitable light-weight compressible insulating material such as foamed plastic. During the activating operation, the pressure of top cell 70 is impressed upon button 76 and the compressible washer 82, and that washer 82 is compressed sufficiently to enable top cell 70 to engage and press down upon the pressure button 76 to activate the bottom cell 72 by the operation of the pressure button 76 fracturing the vial 50 in the second reserve cell 72.

The activator 75, after having activated the two cells 70 and 72 by the pressure operation of the pressure tab, continues to serve as an outer end closure for the flashlight.

When the cells have become used up and require replacement, the activator is unscrewed from the body of the flashlight, and new cells substituted, with the coupling button and the compressible insulating washer properly positioned in the manner indicated in FIG. 6.

If the flashlight is then to be stored for further use, the restraining pin is inserted into its position between the pressure pad and its guide bearing piece, until the subsequent operation is desired. At that time, the detent pin is removed and the activator is manually actuated to impress the pressure force on the two cells to activate them to release the electrolyte in both cells.

The invention has been shown applied to a flashlight for illustrative purposes, and it will be obvious that the cells may be similarly disposed in any utility device in which the cells are to be kept in on-operating condition until actual service is required.

The invention thus may take various forms both in structure and in application without departing from the spirit and scope of the invention as defined in the appended claims.

What is claimed is:

1. An activator for a reserve electric cell that contains anode and cathode components and an electrolyte normally isolated from said components to inactive condition, but controllable from outside the cell through a cell wall to be activated to activate the cell, said activator comprising:
    a pressure plunger to engage the cell wall to release the isolated electrolyte for activation of the cell;
    a manually operable pressure pad for activating the pressure plunger;
    a guide piece for said pressure pad;
    an anchor support for said guide piece;
    and a manually releasable detent for normally locking the manually operable pressure pad against casual undesired actuation, and releasable, when desired, to permit the pressure pad to be operated.

2. An activator for a reserve electric cell, as in claim 1, including
    a container to enclose and support said cell;
    and said anchor support for said guide piece is mounted on said container.

3. An activator for a reserve electric cell, as in claim 1, in which
    said guide piece consists of an annular disc and a coaxial guide cylinder supported thereon;
    and said anchor support for said guide piece is mechanically coupled to said annular disc to provide support to said disc.

4. An activator for a reserve electric cell, as in claim 1, suitable for use with a flashlight in which a reserve cell is stored for future use in a conventional cylindrical body shell of the flashlight, having the light at the front end, and capped at the rear end with a cap normally closing the shell, and removable for access to replace a worn cell; in which
    said anchor support, for said guidepiece and the associated pressure pad, is formed to be fitted as a cap onto the rear end of the flashlight shell, to place the pressure plunger in appropriate position relative to a cell in said cell, to enable said plunger to activate said cell in said shell, in response to actuation of said pressure pad.

5. An activator for a reserve electric cell, as in claim 4, in which said anchor support consists of a threaded cylinder to thread coaxially onto the open end of said flashlight body shell, and embodies a structural element for receiving said guide piece into mechanically locked relationship;

and said pressure pad is mounted on said guide piece for guided sliding movement to actuate said plunger;

and said detent consists of a removable pin extending through the pressure pad and through the guide piece transversely to the axial path of relative movement.

6. An activator for a reserve electric cell, as in claim 4, in which said anchor support carries said guide piece and pressure pad locked together by said detent, all as a unitary assembly to serve as a closure for a flashlight body shell.

7. An activator, as in claim 1, in which said guide piece embodies a supporting platform having a perpendicular axis, and a guide cylinder co-axially mounted on said platform and defining an axial passage;

and said pressure pad embodies a top pressure disc, having an axis to coincide in assembly with said axis of said guide piece platform, and a co-axial sliding piston piece depending from said pressure disc and fittable to move coaxially in said axial passage of said guide cylinder, said piston piece being movable forward through a predetermined distance;

a plunger element at the lower end of said piston piece, movable through said predetermined distance, upon pressure on said pressure pad, and designed to be effective within said distance of movement to activate the associated reserve cell.

8. An activator, as in claim 7, in which said guide cylinder is provided with a transverse hole;

and said sliding piston piece of said pressure pad is similarly provided with a transverse hole for alignment with said transverse hole in said guide cylinder;

and a detent pin for fitting into and through said holes in said guide cylinder and in said piston piece to lock said guide cylinder and piston piece against undesired relative movement, until the pin is intentionally withdrawn and the pressure pad operated said plunger to effective position.

References Cited

UNITED STATES PATENTS

| 3,484,297 | 12/1969 | Zaleski | 136—114 |
|---|---|---|---|
| 3,516,869 | 6/1970 | Broglio | 136—114 |
| 3,665,178 | 5/1972 | Sussingham, et al. | 136—114 X |
| 3,669,753 | 6/1972 | Kaye | 136—114 |

ANTHONY SKAPARS, Primary Examiner